United States Patent [19]
Malherbe

[11] 3,751,139
[45] Aug. 7, 1973

[54] OPTICAL MOUNTING DEVICE FOR USE IN LASER SYSTEMS

[75] Inventor: Edward Phillip Malherbe, Los Angeles, Calif.

[73] Assignee: Union Carbide Corporation, New York, N.Y.

[22] Filed: July 12, 1971

[21] Appl. No.: 161,716

[52] U.S. Cl............ 350/252, 350/288, 331/94.5 D, 356/112
[51] Int. Cl............................................ G02b 7/02
[58] Field of Search...................... 350/67, 247, 252, 350/255, 286, 287, 288, 299, 310; 331/94.5; 356/112

[56] References Cited
UNITED STATES PATENTS

| | | | |
|---|---|---|---|
| 3,555,450 | 1/1971 | Rookwell, Jr. | 350/310 |
| 3,583,792 | 6/1971 | Jones | 350/255 |
| 3,620,607 | 11/1971 | Griest | 350/288 |
| 3,334,959 | 8/1967 | Walsh | 350/310 |
| R27,222 | 11/1971 | Weaver | 350/255 |

Primary Examiner—David Schonberg
Assistant Examiner—Michael J. Tokar
Attorney—Pastoriza & Kelly

[57] ABSTRACT

A rigid housing has a central passage axially aligned so that laser light in a system can pass through the passage. One end of the passage terminates in a flat smoothly machined peripheral surface lying in a given plane and supporting a metal diaphragm having a central opening. One end portion of a support tube is secured in the central opening of the diaphragm, the other end portion extending into the passage of the housing. Adjustment screws extending into the housing serve to apply forces to circumferentially spaced points on the other end of the support tube thereby enabling exact axial alignment of an optical device carried in the support tube with the axis of the laser system.

4 Claims, 5 Drawing Figures

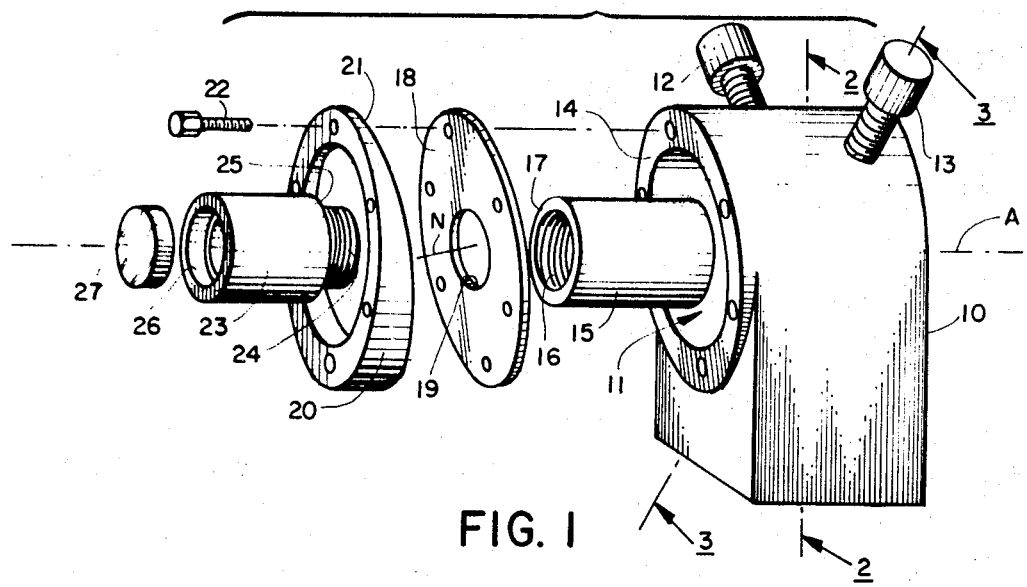
FIG. 1
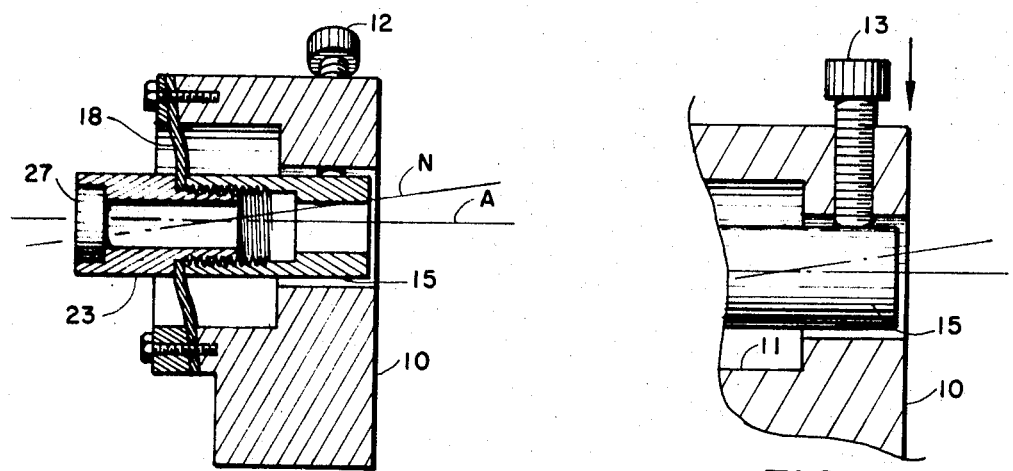
FIG. 2
FIG. 3
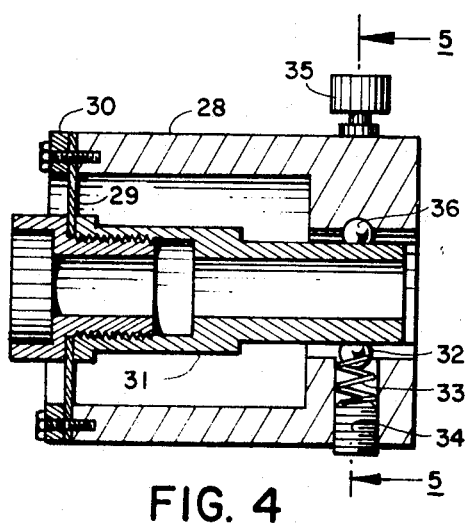
FIG. 4
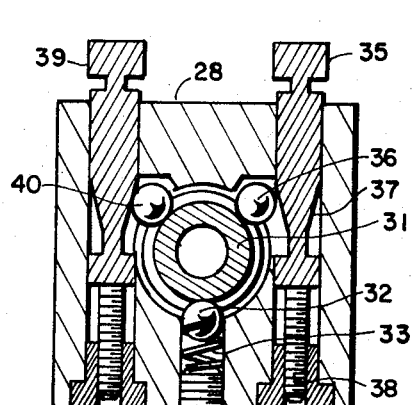
FIG. 5

OPTICAL MOUNTING DEVICE FOR USE IN LASER SYSTEMS

This invention relates generally to mounting devices and more particularly to an improved mounting arrangement for optical components for use in a laser system.

BACKGROUND OF THE INVENTION

Mounts for various components utilized in a laser system such as end mirrors, Q-switches, polarizers and other optical elements in a laser cavity configuration require fairly sophisticated designs. Such a mount should be capable of a wide range of angular adjustment with respect to the optical axis of the laser. At the same time, however, it should enable a high degree of resolution to be realized so that the required adjustments can be made in critical laser applications. Any such mount should be designed so that the exposure to various temperature variations and vibration will not cause angular deviations in the optical component supported in the mount such as a mirror surface.

Previous mounting designs have resorted to three point supports through screws with spring loads. One such design utilizes a split tube where the hinge points are machined orthogonally in the mount. The tube is flexed by means of screws acting as arms attached to the tubular structure thereby varying the axis of any optical element supported in the tube structure. Another system provides a perforated plate using small orthogonal elements as torsion hinges such that movement is at right angles to each set of torsional elements. These elements act as pinned hinge points. Problems encountered with these types of mounts are their vulnerability to vibrations particularly those limited to hinge point type pinning. Maintaining proper temperature stability has also presented problems.

BRIEF DESCRIPTION OF THE PRESENT INVENTION

The essence of the present invention resides in the use of a sheet type diaphragm having a central opening for securing one end portion of a support tube. Suitable force applying means such as adjustment screws are then utilized to apply forces at circumferentially spaced points adjacent to the other end of the tube thereby setting up a bending load in the diaphragm. Any external vibrations or shock loads tend to load the diaphragm over a large stress field in tension. Tension fields are more favorable to high stresses then torsional type stresses. By using a thin flexible sheet like diaphragm, the desired feature of a wide range of adjustments is realizable together with the feature of enabling critical adjustments to be made. The diaphragm design prevents axial movement of the optical element in any set angular position.

BRIEF DESCRIPTION OF THE DRAWINGS

A better understanding of the invention will be had by now referring to the accompanying drawings, in which:

FIG. 1 is an exploded perspective view of a mount for use in a laser system in accord with one embodiment of the invention;

FIG. 2 is a cross-section of the mount in assembled position taken in the direction of the arrows 2—2 of FIG. 1;

FIG. 3 is an enlarged fragmentary view partly in cross-section taken in the direction 3—3 of FIG. 1;

FIG. 4 is a cross-section of a mount in accord with another embodiment of the invention; and, FIG. 5 is a cross-section taken in the direction of the arrows 5—5 of the mount shown in FIG. 4.

DETAILED DESCRIPTION OF THE INVENTION

Referring to FIG. 1 there is shown an optical mounting device including a rigid housing or frame structure 10 having a central passage 11 passing therethrough, the axis of the passage being designated A. The housing 10 would normally be positioned in a laser system with the passage axis A in substantial alignment with the optical axis of the system such that laser light would pass completely through the passage 11. The rigid housing includes adjustment screws 12 and 13 which in the embodiment of FIG. 1 extend radially inwardly towards the passage axis A. The front end of the central passage 11 terminates in a flat peripheral surface 14 lying in a given plane which, as is clear from FIG. 1, is skewed with respect to the axis A.

The remaining components of the mounting include a portion 15 of a support tube terminating at one end in internal threads 16 and a flat end surface 17. A metal flexible diaphragm 18 has a central opening 19 and is arranged to be secured to the housing 10 by a cooperating end block 20 having a flat peripheral surface 21 tilted with respect to the axis A so as to mate with the skewed or tilted end surface 14 of the housing and sandwich the outer periphery of the diaphragm 18 therebetween. Screws 22 serve to fasten the assembly in a secure arrangement. Another portion 23 of the support tube includes reduced diameter end threads 24 to define a flat shoulder 25. The threads 24 mate with the internal threads 16 of the portion 15 of the support tube in such a manner that the peripheral edge of the inner central opening 19 of the diaphragm 18 is sandwiched between the end 17 and shoulder 25 so that the complete support tube structure is secured to the diaphragm. The forward end of the support tube structure includes a recess 26 for holding an optical component 27 such as an end mirror, polarizer, or any other particular component to be utilized in the laser system.

The assembled relationship will be clear be referring to FIG. 2 wherein it will be noted that because of the skew plane in which the diaphragm 18 lies, the axis of the tubular structure would normally coincide with the normal N of the skew plane when the diaphragm 18 is unstressed. However, in FIG. 2 the inner end of the support tube extending into the passage 11 of the housing 10 has force applied thereto by the screw adjustment members such as 12 to bring the support tube into axial alignment with the axis A thereby imparting a bending to the diaphragm 18.

FIG. 3 illustrates clearly the manner in which the adjustment screw such as the screw 13 may be threaded downwardly to exert a force on a circumferential portion of the end portion 15 of the support tube. From the physical arrangement as shown in FIGS. 1 and 2, it will be evident that the bending of the diaphragm results in a reaction force opposing the force applied by the screws 12 and 13. Essentially, these screws form angles of 45° on either side of a plane including the normal of the skew plane and the axis A of the central passage in the housing 10. The support tube is thus engaged at points circumferentially spaced 90°. As a consequence, individual adjustment of the screws will permit varying the angle of the axis of the support tube with respect to the axis A over 360°. The reaction forces by the diaphragm as a consequence of its skewed mounting eliminate the necessity for any springs or biasing means in the adjustment screws.

Where only small angular adjustments are necessary, the diaphragm 18 may be made relatively stiff. Where wider angular variations are desired the diaphragm may be made less stiff. In either event, the high diaphragm stresses opposing the forces applied by the adjustment screws assures excellent resistance to shock and vibration. Because of the washer like configuration of the diaphragm, once an angular adjustment has been made, the diaphragm will inhibit any axial displacement of the support tube and very acurate alignment can be realized.

Referring now to FIGS. 4 and 5 there is shown another embodiment of the invention wherein the given plane in which the diaphragm lies is not skewed but rather is substantially normal to the axis of the laser system. Thus, there is illustrated in FIG. 4 a housing 28 having a central passage similar to the housing 10 of FIG. 1 together with a diaphragm 29 secured by an end plate 30 to the open end of the central passage. The support tube is shown at 31 with its one end portion secured to the central aperture in the diaphragm 29 and its other end extending into the central passage of the housing. The adjustment screw means or force applying means in the embodiment of FIGS. 4 and 5 includes a biasing means in the form of a ball bearing 32 urged as by a spring 33 the force of which can be adjusted by a thread screw 34 against one circumferential point of the support tube 31. Two other circumferential points spaced 90° with respect to each other have pressure applied by screws one of which is shown at 35 in FIG. 4 and a co-operating ball bearing 36.

With particular reference to FIG. 5 it will be noted that the adjustment screw 35 includes a tapered shaft portion defining a conical surface 37 there being provided threading means 38 in the lower end of the housing bore for threadedly receiving the end of the screw. With this arrangement, downward threading of the screw 35 will cam or bias the ball bearing 36 against the end portion of the support tube 31.

The third application of force to the support tube is accomplished by a similar adjustment screw 39 having a tapered shaft portion co-operating with a ball bearing 40. In the embodiment of FIGS. 4 and 5, the housing bores are parallel to each other on either side of the plane including the axis of the housing, the geometry being such as to assure controlled forces at points circumferentially spaced 90° with respect to each ball 36 and 40 so that mutually perpendicular movement of the end of the support tube 31 is provided with respect to these pressure points.

OPERATION

The operation of the mountings described in FIGS. 1 to 5 will be evident. In the first embodiment, when no force is applied by the adjustment screws 12 and 13, the axis of the support tube made up of the portions 15 and 23 would be perpendicular to the plane of the skewed diaphragm 18; that is, in substantial alignment with the normal N. Application of force by threading of the adjustment screws 12 and 13 will then bend the diaphragm 18 through the support tube so that a fairly stiff reaction force against the adjustment screws will result. Very exact alignment of the axis of the support tube with the optical axis of the laser system can readily be achieved and the resulting configuration is substantially immune to external vibrations as well as temperature variations. By taking advantage of the flexibility of the diaphragm and mounting of the same in the skew plane, additional springs and the like are not necessary.

In the embodiment of FIGS. 4 and 5, the axis of the support tube 31 will be substantially aligned with the axis of the laser system when the diaphragm 29 is in its unstressed state. Exact alignment of the support tube and optical device carried thereby can be achieved by the adjustment screws 35 and 39 working against the biasing bearing 32 shown in FIG. 5. It will be clear that the diaphragm 29 in the embodiment of FIG. 4 will be uniformly stressed for any angular axial variation over 360° because of the symmetry.

In both embodiments, the sheet diaphragm construction will prevent axial movement of the support tube and thus the optical component carried thereby once the same has been aligned.

An important feature of the mounting in both embodiments is the face that laser light can pass completely through the support tube and thus the supported optical element without any interference from the mounting itself. While such feature would not be necessary in supporting a 100 percent reflecting end mirror, when supporting other optical elements such as Q-switches or polarizers, the advantage of complete transmission through the mounting obtains.

What is claimed is:

1. A mounting device including: a frame; a diaphragm secured at its peripheral edge portions to said frame, said diaphragm having a central opening; a support tube secured in said central opening with its axis in substantial alignment with the normal to the plane of said diaphragm when in unstressed condition; means for holding a component having an axis to be axially aligned with a given axis, in one end portion of said support tube; and force applying means coupled to said frame for exerting a force on said support tube adjacent to its other end in a direction generally normal to the axis of said support tube, said diaphragm lying in a plane tilted to said given axis whereby said diaphragm is stressed to provide a reaction force in said support tube to the force applied by said force applying means, whereby the axis of said component may be exactly aligned with said given axis by said force applying means.

2. An optical mounting device for use in a laser system, comprising, in combination:
   a. a rigid housing frame having a central passage axially aligned so that laser light in said system can pass therethrough, one end of said passage terminating in a flat peripheral surface lying in a given plane;
   b. a metal diaphragm having a central opening to define a washer like shape secured to said flat peripheral surface to lie in said given plane when in an unstressed condition;
   c. a support tube secured in said central opening of said diaphragm and extending into said passage, the axis of said tube coinciding with the normal to said given plane when said diaphragm is in said unstressed condition;
   d. means adjacent to one end of said tube for holding an optical component used in said laser system; and e. adjustment screw means passing into said housing for applying a force to circumferentially spaced portions of said support tube adjacent to its other end spaced from the portion of said tube secured to said diaphragm so that individual adjustment of said adjustment screw means enables bending forces to be applied to said diaphragm through said support tube in directions to bring the axis of said support tube and that of said optical component into exact alignment with the optical axis of said laser system.

3. A device according to claim 2, in which said given plane is tilted with respect to the axis of said passage to define a skew plane, and in which said adjustment screw means comprise screws, said housing having threaded bores receiving said screws, said bores extending radially towards the axis of said passage at angles of 45° on either side of a plane including the axis of said passage and a normal to said skew plane so that the ends of said screws engage the support tube at points cicumferentially spaced 90°, said diaphragm being stressed and providing a reactive force to forces applied by such screws.

4. A device according to claim 2, in which the normal to said given plane is substantially aligned with the axis of said passage when said diaphragm is in unstressed condition and in which said adjustment screw means comprise screws having tapered shaft portions defining conical surfaces, said housing having bores receiving said screws in parallel relationship on either side of the axis of said passage; thread means in the lower portions of said bores threadedly receiving the screws below said tapered portions; ball bearings disposed between said conical surfaces and said support tube such that downward pressure by said screws urges said bearings against said support tube to apply force at points circumferentially spaced 90° degrees from each other; and a biasing means in said housing applying a reacting force at a third point on said support tube circumferentially spaced 135° from said points of engagement by said bearings.

* * * * *